UNITED STATES PATENT OFFICE.

PETER T. AUSTEN, OF NEW BRUNSWICK, NEW JERSEY.

METHOD OF PREPARING AN AQUEOUS BLEACHING SOLUTION OF SODA OR POTASSA.

SPECIFICATION forming part of Letters Patent No. 223,463, dated January 13, 1880.

Application filed September 25, 1879.

*To all whom it may concern:*

Be it known that I, PETER T. AUSTEN, of New Brunswick, in the county of Middlesex and State of New Jersey, have invented a new and Improved Method of Preparing an Aqueous Bleaching Solution of Soda or Potassa, of which the following is a specification.

The object of this invention is to furnish a new and effective bleaching agent for animal fibers and fabrics.

In preparing this solution the vessels used should be lined with copper, or should have a surface that the various agents employed will not act upon. In such a vessel of suitable capacity pulverized barium peroxide ($BaO_2$,) or barium peroxyhydrate ($BaO_2 8H_2O$,) is well stirred in water for about ten minutes. To produce the best result the temperature of the water should be kept below 100° Fahrenheit. A concentrated solution of sodium carbonate, (ordinary sal-soda,) made by dissolving in a small quantity of hot water an amount of sodium carbonate equal to two or three times the weight of the barium peroxide taken, is then added gradually, the liquid being stirred continually during the operation, and for from five to ten minutes longer. By this operation the barium peroxide is converted into barium carbonate, and becomes insoluble. Oxygen is set free and remains in the solution. Sodium hydrate is formed and remains in the solution, and the excess of sodium carbonate is unacted upon, and remains unchanged in the solution. The reaction that takes place is expressed by the following formula: $BaO_2 + 2Na_2CO_3 + H_2O = BaCO_2 + 2NA, OH + O + Na_2CO_3 Aq.$ It is evident that potassium carbonate or ammonium carbonate will also give an analogous reaction.

After the stirring there is added an amount of silicate of soda or potassa (water-glass) about equal to the amount of sodium carbonate taken, and the mixture is again stirred for from five to ten minutes, after which the precipitate is allowed to settle, and the clear supernatant liquid is drawn off; or the precipitate may be removed by any convenient method of filtration.

The precipitated barium carbonate thus obtained can be used for any of the purposes to which barium carbonate is applied, particularly, however, for the manufacture of barium peroxide.

The clear solution obtained as above described, containing silicate of soda, oxygen, sodium hydrate, and sodium carbonate, is the bleaching agent.

It is evident that different varieties of textile fabrics and fibers will require solutions of different concentrations and exposures of greater or less duration to the bleaching action of the solution, depending upon the amount and nature of the color to be removed.

Solutions are prepared according to the foregoing description containing various percentages of oxygen by volume. A most efficacious strength has been found to be a solution containing sixty-six per cent. of oxygen by volume, which solution is prepared from the following proportions: water, one hundred liters, (twenty-five gallons;) barium peroxide, one kilogram, (two pounds three ounces;) silicate of soda, two kilograms, (four pounds six ounces;) sodium carbonate, two kilograms, (four pounds six ounces.)

I will now briefly describe the process of bleaching as applied to silk.

The silk, after having been freed from gum, &c., by boiling in a soap solution ("stripped") is passed through a hot water to remove the soap. It is then placed in a suitable vessel, preferably a clean copper-lined dye-bath, filled with the bleaching-liquid, and allowed to stand undisturbed. The temperature should be from about 70° to 100° Fahrenheit. If the solution is weak—as, for instance, with about ten per cent. solution—a higher temperature may be used; but it is preferable to take more time and a lower temperature. The duration of the exposure of the silk to the bleaching action of the liquid depends upon the amount and nature of the coloring-matter. For light-colored silks from five to six hours' exposure is enough, but for the coarser and more deeply colored varieties from two to three days are necessary. After the bleaching action is completed, the silk is taken out of the bleaching-bath and well rinsed in cold water. It is then passed through a hot-water, and finally through a hot-soap, solution. With some of the finer grades of silk the treatment with soap may be omitted. These various washings remove the adhering bleaching-liquid, and also a certain amount of the coloring-matters which have been decolorized and rendered soluble by the action of the bleaching agent.

With certain varieties of silk whose color proves to be very refractory a final sulphur-bleach may be used with good effect.

Having thus described my invention, I claim as new and desire to secure by Letters Patent—

A bleaching solution composed of silicate of sodium or potassium, barium peroxide, and the hydrate of sodium, potassium, or ammonium, as described.

P. TOWNSEND AUSTEN.

Witnesses:
  JAMES T. GRAHAM,
  AMOS W. HART.